United States Patent
Valkenburg et al.

(10) Patent No.: US 6,926,792 B1
(45) Date of Patent: Aug. 9, 2005

(54) METHOD OF FABRICATING AN AIR-BAG AND AN AIR-BAG FABRICATED BY THE METHOD

(75) Inventors: Simon Valkenburg, Windsor (CA); Norbert Pitzer, Karlsfeld (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 09/869,105

(22) PCT Filed: Dec. 22, 1999

(86) PCT No.: PCT/SE99/02460
§ 371 (c)(1),
(2), (4) Date: Aug. 30, 2001

(87) PCT Pub. No.: WO00/38954
PCT Pub. Date: Jul. 6, 2000

(30) Foreign Application Priority Data
Dec. 24, 1998 (GB) ................................. 9828701

(51) Int. Cl.⁷ .......................................... B29C 65/00
(52) U.S. Cl. ................... 156/287; 156/156; 156/293; 427/236; 427/238; 264/523
(58) Field of Search ................. 156/156, 287, 156/294, 285, 293; 428/35.2; 280/728.1, 280/729; 427/181, 230, 231, 232, 233, 234, 427/235, 236, 237, 238, 239; 264/509, 516, 264/523, DIG. 1

(56) References Cited

U.S. PATENT DOCUMENTS

| | | | |
|---|---|---|---|
| 2,288,454 A * | 6/1942 | Hob | 264/539 |
| 3,410,250 A * | 11/1968 | Kulie et al. | 118/308 |
| 3,705,645 A | 12/1972 | Konen | |
| 4,496,517 A * | 1/1985 | Kinoshita et al. | 264/521 |
| 4,994,225 A * | 2/1991 | Davis | 264/257 |
| 4,997,502 A * | 3/1991 | Schnaars | 156/156 |
| 5,044,663 A * | 9/1991 | Seizert | 280/730.1 |
| 5,066,039 A | 11/1991 | Shitanoki et al. | |
| 5,073,418 A | 12/1991 | Thornton et al. | |
| 5,076,975 A | 12/1991 | Davis | |
| 5,100,168 A | 3/1992 | Horiuchi et al. | |
| 5,259,645 A | 11/1993 | Hirabayashi et al. | |
| 5,700,870 A * | 12/1997 | Mueller et al. | 524/837 |
| 5,788,270 A * | 8/1998 | H.ANG.land et al. | 280/729 |
| 6,276,712 B1 * | 8/2001 | Welch et al. | 280/730.2 |

FOREIGN PATENT DOCUMENTS

| | | |
|---|---|---|
| EP | 0 535 649 A1 | 4/1993 |
| EP | 0 866 164 A1 | 9/1998 |
| JP | 55092119 | 7/1980 |
| JP | 58072437 | 4/1983 |
| WO | WO98/30748 | 7/1998 |

* cited by examiner

OTHER PUBLICATIONS

Abstract of JP 60159032 Published: Jan. 1984 Country: Japan Inventor: Yamauchi.*

Primary Examiner—Jeff H. Aftergut
Assistant Examiner—John L. Goff
(74) Attorney, Agent, or Firm—Venable LLP; Catherine M. Voorhees

(57) ABSTRACT

In manufacturing an air-bag (1) which is formed from two super-imposed layers of fabric (2) interconnected by a plurality of seams (3), a sealant material is applied to the interior of the air-bag. The sealant material is applied by introducing a mandrel (10) carrying a parison of the sealant material (11) into the air-bag, and injecting air into the mandrel.

11 Claims, 1 Drawing Sheet

METHOD OF FABRICATING AN AIR-BAG AND AN AIR-BAG FABRICATED BY THE METHOD

BACKGROUND OF THE INVENTION

The present invention relates to a method of fabricating an air-bag and more particularly relates to an air-bag which, when inflated, is intended to be located between the head or body of the driver or front-seat occupant of the motor vehicle and the adjacent window. Such an air-bag may be termed a side-curtain and may be adapted to be inflated in the event that a side impact or roll-over situation should occur. A side-curtain may extend adjacent the head of the driver or front seat occupant of the motor vehicle, or may extend from the front of the vehicle to the rear of the motor vehicle, along the side of the vehicle, thus providing protection, not only for the driver or front seat occupant of the vehicle, but also for an occupant of the rear seat of the vehicle.

A side-curtain has to be deployed extremely rapidly if it is to provide protection in the event that a side impact should occur and consequently the side-curtain is inflated by injecting a large quantity of gas into the side-curtain very rapidly. The inflation consequently violent, and the fabric may stretch at certain points.

In order to improve the gas-tightness of the fabric that makes an air-bag, it is conventional to provide the fabric with a coating of a sealant material such as a silicone rubber. In certain air-bags, such as air-bags intended to provide protection for the driver or front seat occupant of the vehicle in the event that a front impact should occur, the air-bag is initially fabricated with the coating on the exterior of the air-bag, and then the air-bag is turned inside-out before being installed in the motor vehicle so that the coating is then on the interior of the air-bags. In the event that the air-bag is inflated, the gas that is injected into the air-bag tends to urge the coating into firm contact with the yarns constituting the fabric from which the air-bag is made, ensuring that any small gap that might exist between the yarns is sealed, consequently ensuring the integrity and gas-tightness of the air-bag. This is important, since in many instances an inert gas of low atomic weight is utilised to inflate the air-bag, and such a gas can easily pass through very small interstices between adjacent yarns. The coating also protects the fabric from the hot gas that maybe present in the air-bag when it is inflated. The strength of the fabric maybe reduced if the fabric is not protected from the hot gases.

In the case of a side-curtain, however, the air-bag is of a complex form and can not readily be turned inside-out. Consequently, the coating has to be applied to the exterior of the air-bag. This means that the pressure of gas present within the air-bag when it is inflated tends to dislodge the coating from the exterior of the air-bag, rather than press the coating more firmly into the interstices of the fabric. Also, as the bag is inflated the fabric from which the bag is made may stretch, especially in areas where high stresses are applied to the bag, and this may cause the coating to become dislodged from the fabric. For these reasons the coating is often relatively heavy and may be applied at a rate of 130 grams per square meter. This not only increases the weight of the air-bag, but substantially increases the cost, since the silicone rubber material is expensive. Also the lack of an internal coating means that the fabric of the air-bag will not be protected from the hot gasses.

It has been found that the silicone rubber applied to the exterior of the air-bag provides various disadvantages in that the silicone rubber is tacky and therefore exerts a high friction. Consequently, during deployment of the air-bag, the air-bag may stick to the glass or the material forming the "B"-Post of the vehicle, thus leading to distortion of the air-bag during the inflation process. Should the air-bag contact the passenger or occupant of the vehicle during the inflation process, the air-bag may impart an abrasion wound.

SUMMARY OF THE INVENTION

The present invention seeks to provide an air-bag in which the disadvantages of the exterior-coated air-bag as described above are obviated or reduced.

According to one aspect of this invention there is provided a method of fabricating an air-bag, the method comprising the steps of forming a bag from at least one layer of fabric, introducing a sealant into the bag and blowing the sealant into contact with the interior of the bag with a propellant gas so that the sealant material forms a sealant layer on the interior of the bag.

In one embodiment the sealant is in the form of a parison of a synthetic polymer material carried on a mandrel, said blowing step consisting of injecting said propellant gas through the mandrel.

Conveniently the parison is coated with adhesive.

In an alternative embodiment the sealant is introduced into the bag in the form of an aerosol or a suspension of powder in the propellant gas.

Preferably the sealant is formed of polyamide, polyester, polyvinylchloride or polyurethane silicone.

Conveniently the bag is heated as the sealant is blown into contact with the interior of the bag.

Advantageously the propellant gas is heated.

Preferably the sealant layer is a reinforcing layer.

Conveniently the air-bag is a side-curtain air-bag.

The invention also relates to an air-bag when fabricated by a method as described above.

According to another aspect of this invention there is provided an air-bag comprising a bag formed from a layer of fabric, the interior of the air-bag being provided with a sealant layer.

Conveniently the sealant layer is a reinforcing layer.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
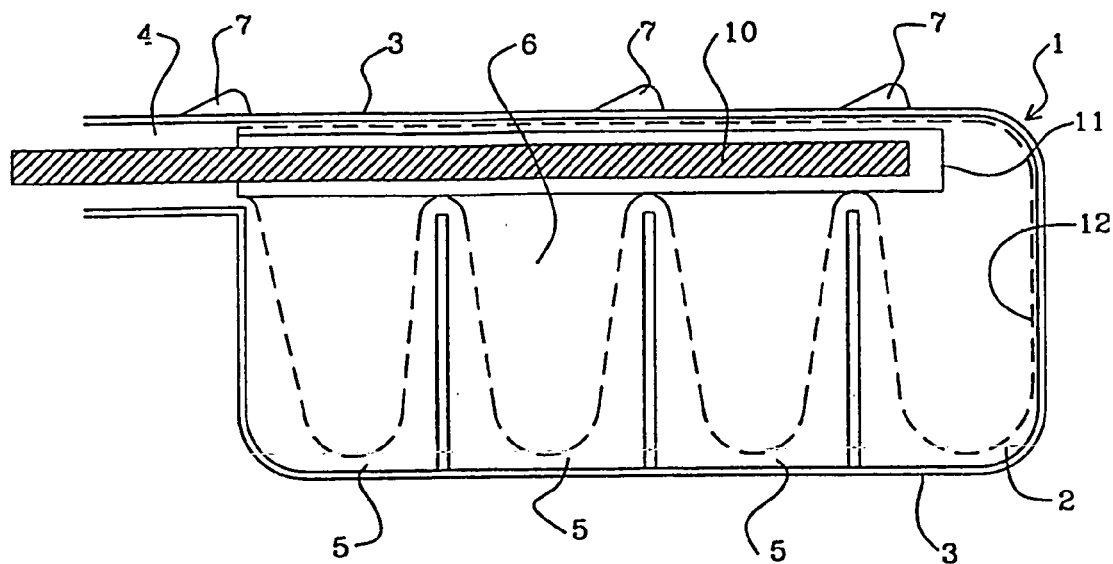
FIG. 1 is a diagrammatic view of a simple embodiment of air-bag in accordance with the invention during the manufacturing process.

Referring now to FIG. 1 of the accompanying drawings an air-bag 1 which is in the form of a side-curtain, is formed from two super-imposed layers of fabric 2 inter-connected by a plurality of seams 3 which inter-connect selected areas of the upper and lower layers of fabric forming the air-bag 1. The seams 3 define a gas flow duct 4 extending substantially parallel with the upper edge of the bag, and also define a plurality of substantially vertical parallel spaced cells 5, each of which communicate, by means of a communication region 6, with the gas flow duct 4. The air-bag 1 is also provided with a plurality of protruding lugs 7 which protrude from a position adjacent the gas flow duct 4 by means of which the air-bag may be mounted in position in a motor vehicle.

The air-bag, as thus far described, is formed from an appropriate fabric which may, for example, be a conventional fabric woven from yarns or fibres made from polyamide, polyester, polyvinylchloride or some other appropriate synthetic material, although it is envisaged that the fabric may be knitted or non-woven. The seams 3 may be formed by stitching together the super-imposed layers of fabric, although it is preferred that the seams are fabricated by weaving together threads from the upper layer of fabric together with threads from the lower layer of fabric in selected regions to form the seams, generally as described in WO 90/09295.

Following the initial fabrication of the bag, a reinforcing sealant coating is applied to the interior of the bag. The reinforcing sealant coating is applied to the interior of the bag by forming, on an hollow air injecting mandrel 10 a parison of a plastics material 11, such as a polyamide, polyester or polyvinylchloride material, or polyurethane silicone with the parison being in a substantially plastic state.

The exterior of the parison may be coated with adhesive. The mandrel together with the parison, is inserted into the gas flow passage 4 of the bag. To facilitate insertion of the mandrel 10 and the parison 11, the gas flow passage 4 may be gently inflated or may be held in an open position by appropriate mechanical means. For example, vacuum suction means may be applied to opposite sides of the exterior of the portion of the air-bag 1 that define the gas flow passage 4, thus separating the layers of fabric that form the gas flow passage 4 facilitating the insertion of the mandrel and the parison into the gas flow passage.

Once the mandrel and parison have been inserted into the gas flow passage, to occupy the position illustrated in FIG. 1, air or other propellant gas is injected through the hollow mandrel in order to inflate the parison. An intermediate stage during inflation of the parison is indicated by the dotted line 12 shown in FIG. 1. The parison is seen to be inflating to fill not only the gas flow passage 4, but also the cells 5. Thus, the parison is blown into the interior of the air-bag. The parison expands until the parison contacts the whole of the area of the fabric 2 that defines the interior of the air-bag 1. The parison is then adhered to the fabric, and forms a reinforcing sealant layer on the interior of the bag. The step of adhering of the parison of the fabric may be facilitated by the application of heat to the exterior of the bag, depending upon the nature of the polymer material utilised for the parison, and the nature of the adhesive, if an adhesive is provided. Also the gas injected through the mandrel to inflate the parison maybe heated.

Figure 2:
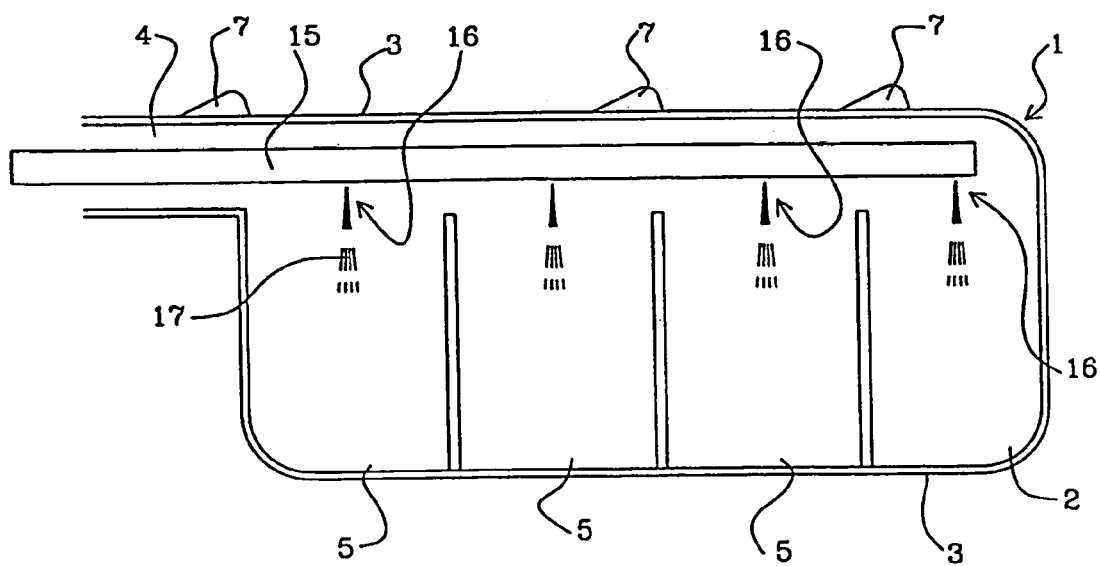
FIG. 2 is a corresponding view of an alternative embodiment of the invention.

Referring now to FIG. 2 of the accompanying drawings, an air-bag is shown which is the same as the basic air-bag shown in FIG. 1 as described above when mentioning the reference numerals 1 to 7.

FIG. 2 illustrates a fine elongate mandrel 15 that has been introduced into the air-bag through the gas flow duct 4. The mandrel 15 is provided with a plurality of apertures 16 at positions spaced along the length of the mandrel. A propellant gas, which may be warmed or pre-heated, is introduced into the mandrel. Entrained with the propellant gas is a sealant material which, on leaving the mandrel, forms an aerosol or a powder suspension 17 with the propellant gas. The aerosol or powder suspension is therefore injected into the interior of the air-bag by the warm propellant gas. The interior of the air-bag inflates during this process, due to the continuous flow of the propellant gas. Whilst, as mentioned above, the propellant gas may be heated, equally the air-bag itself may be heated by performing the described procedure within a heat chamber or oven.

The propellant gas initially flows out of the air-bag through the fabric material, which is porous, but the sealant material which forms the aerosol or powder suspension becomes entrapped by the fabric and thus this material covers the inner side of the air-bag. Due to die elevated temperature of the gas and/or the elevated temperature of the bag itself, the sealant material that has become trapped on the inner side of the air-bag forms a sealant layer with reinforcing properties.

Thus a reinforcant sealant coating made of a material such as polyamide, polyester, polyvinylchloride or polyurethane silicone is established on the interior surface of the air-bag.

It is envisaged that following the procedure described above, the material that initially formed the parison will constitute a reinforcant sealant coating which covers the whole of die interior of die air-bag. The air-bag itself, however, does not suffer from any additional stiffness and can thus be folded in a conventional manner.

It is to be appreciated that the reinforcing sealant coating is provided on the interior of the air-bag, thus protecting the fabric to be utilised in the fabrication of the air-bag from the heat of any gas injected into the air-bag from the gas generator during inflation of the bag. The fabric 2 provides the bag with substantial strength, and should there be any tendency for interstices to develop between the fibres of the fabric, the reinforcing and sealant film will be forced into those interstices, tending to seal the interstices.

It is envisaged that it will be a practicable matter to fabricate bags with a reinforcing and sealant layer of a predetermined thickness. Because the air-bag is inflated during the process of manufacture, the integrity of the sealant film can be checked at that stage.

It is envisaged that a preferred embodiment of an air-bag, as described above, may be able to withstand an internal pressure of up to 10 bars and also high temperatures of up to 600° C., whilst the manufacturing costs will be acceptable.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of fabricating an air-bag, the method comprising the following steps:
   forming an air-bag from at least one layer of fabric, said air-bag being formed with a plurality of inflatable cells that are separated from one another by seams;
   introducing a sealant into an interior of the air-bag and blowing the sealant into contact with the interior of each inflatable cell of the air-bag with a propellant gas so that the sealant material forms a sealant layer on the interior of each inflatable cell of the air-bag.

2. A method according to claim 1, wherein the sealant is in the form of a parison of a synthetic polymer material carried on a mandrel, and said blowing step comprises injecting said propellant gas through the mandrel.

3. A method according to claim 2 wherein the parison is coated with adhesive.

4. A method according to claim 1 wherein the sealant is introduced into the bag in the form of an aerosol or a suspension of powder in the propellant gas.

5. A method according to claim 1 wherein the sealant is formed of polyamide, polyester, polyvinylchloride or polyurethane silicone.

6. A method according to claim 1 wherein the bag is heated as the sealant is blown into contact with the interior of the bag.

7. A method according to claim 1 wherein the propellant gas is heated.

8. A method according to claim 1 wherein the sealant layer is a reinforcing layer.

9. A method according to claim 1 wherein the air-bag is a side-curtain air-bag.

10. A method of fabricating an air-bag, the method comprising the following steps:

forming an air-bag from at least one layer of fabric, said air-bag being formed with a plurality of inflatable cells that are separated from one another by seams;

introducing a sealant into an interior of each inflatable cell of the formed air-bag;

blowing the sealant into contact with the interior of the formed air-bag with a propellant gas so that the sealant material forms a sealant layer on the interior of each inflatable cell of the air-bag; and heating the formed air-bag as the sealant is blown into contact with the interior of the air-bag.

11. A method of fabricating an air-bag, the method comprising the following steps:

forming an air-bag from at least one layer of fabric, said air-bag being formed with a plurality of inflatable cells that are separated from one another by seams;

introducing a sealant into an interior of each inflatable cell of the formed air-bag; and blowing the sealant into contact with the interior of the formed air-bag with a heated propellant gas so that the sealant material forms a sealant layer on the interior of each inflatable cell of the formed air-bag.

\* \* \* \* \*